United States Patent
Jang et al.

(10) Patent No.: US 8,749,118 B2
(45) Date of Patent: Jun. 10, 2014

(54) VIBRATING ACTUATOR ASSEMBLY

(75) Inventors: Cheol-eun Jang, Suwon-si (KR);
Chan-young Moon, Siheung-si (KR);
Sung-wook Choi, Changwon-si (KR);
Woo-jong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 13/193,885

(22) Filed: Jul. 29, 2011

(65) Prior Publication Data

US 2012/0104899 A1    May 3, 2012

(30) Foreign Application Priority Data

Oct. 27, 2010 (KR) .................. 10-2010-0105382

(51) Int. Cl.
*H02N 2/00* (2006.01)
(52) U.S. Cl.
USPC .............. 310/324; 310/323.02; 310/323.04; 310/323.09; 310/323.13; 310/328
(58) Field of Classification Search
USPC ............. 310/323.01, 323.02, 323.04, 323.08, 310/323.09, 323.13, 323.17, 324, 328
See application file for complete search history.

(56) References Cited

U.S. PATENT DOCUMENTS

| | | | | |
|---|---|---|---|---|
| 4,019,073 A | * | 4/1977 | Vishnevsky et al. | 310/322 |
| 7,169,533 B2 | * | 1/2007 | Sakaue et al. | 430/270.13 |
| 7,170,214 B2 | | 1/2007 | Henderson et al. | |
| 7,456,546 B2 | * | 11/2008 | Namikawa et al. | 310/317 |
| 2007/0040475 A1 | * | 2/2007 | Namikawa | 310/323.17 |
| 2008/0030103 A1 | * | 2/2008 | Neumann | 310/322 |
| 2009/0309457 A1 | * | 12/2009 | Doshida et al. | 310/323.02 |
| 2011/0122516 A1 | * | 5/2011 | Jang | 359/823 |
| 2011/0234049 A1 | * | 9/2011 | Takizawa | 310/323.12 |
| 2011/0260580 A1 | * | 10/2011 | Blume et al. | 310/323.02 |

FOREIGN PATENT DOCUMENTS

| | | |
|---|---|---|
| JP | 2009-124804 A | 6/2009 |
| JP | 2009-124805 A | 6/2009 |
| JP | 2009-136079 A | 6/2009 |

* cited by examiner

*Primary Examiner* — Thomas Dougherty
(74) *Attorney, Agent, or Firm* — Drinker Biddle & Reath LLP

(57) ABSTRACT

A vibrating actuator assembly includes a diaphragm, at least one vibrator at the diaphragm and that vibrates when an electric signal is applied thereto, a vibration shaft having one end connected to the diaphragm, a rotor on an outer side of the vibration shaft to contact an outer surface of the vibration shaft and that moves by vibration of the vibration shaft, and an elastic presser at another end of the vibration shaft and that elastically presses the rotor toward the diaphragm.

12 Claims, 7 Drawing Sheets

VIBRATING ACTUATOR ASSEMBLY

CROSS-REFERENCE TO RELATED PATENT APPLICATION

This application claims the priority benefit of Korean Patent Application No. 10-2010-0105382, filed on Oct. 27, 2010, in the Korean Intellectual Property Office, the entire disclosure of which is incorporated herein by reference.

BACKGROUND

1. Field of the Invention

Embodiments relate to a vibrating actuator assembly, and more particularly, to a vibrating actuator assembly, whereby generation of noise and vibration is reduced, strong driving power is generated by using a compact structure, and precise position control is possible.

2. Description of the Related Art

An optical system having optical elements, such as lenses, includes a lens driving device to move the lenses. The lens driving device moves the lenses to change a relative distance between them, thereby realizing a zooming function or an auto focusing function.

The lens driving device may include a driving unit such as a stepping motor. In this case, since a reduction gear and a cam are used to change the rotation of the stepping motor into a rectilinear motion, the volume of the lens driving device may increase, and a structure of the lens driving device may be complex. Also, during a normal rotation or reverse rotation, a stepping error may be generated, power consumption may be high, and high current and heat may be generated due to backlash.

Recently, a piezoelectric device that operates according to a piezoelectric effect to move the lenses of an optical system has been widely used. A miniaturized driving motor may be manufactured by using the piezoelectric device.

However, since a conventional optical system including such a piezoelectric device also includes elements, such as a gear or a cam, to change a motion of the piezoelectric device into driving power for moving lenses, the conventional optical system may have a complex structure, and accurate position control may be difficult due to a moving error between the elements.

SUMMARY

Embodiments can provide a vibrating actuator assembly, whereby generation of noise and vibration can be reduced.

Embodiments can also provide a vibrating actuator assembly, whereby strong driving power can be generated by using a compact structure and precise position control can be possible.

Embodiments can also provide a vibrating actuator assembly capable of precise position control by displacing a rotor by using a vibration shaft connected to a diaphragm that is vibrated by a vibrator.

According to an embodiment, there is provided a vibrating actuator assembly. The vibrating actuator assembly includes a diaphragm, at least one vibrator at the diaphragm and that vibrates when an electric signal is applied thereto, a vibration shaft having one end connected to the diaphragm, a rotor on an outer side of the vibration shaft to contact an outer surface of the vibration shaft and that moves by vibration of the vibration shaft, and an elastic presser at another end of the vibration shaft and that elastically presses the rotor toward the diaphragm.

The elastic presser may include a support combined to the other end of the vibration shaft, and an elastic member having one end contacting the support and another end contacting the rotor.

The vibrating actuator assembly may further include a first intermediate plate between the elastic member and the rotor.

The vibrating actuator assembly may further include a second intermediate plate between the rotor and the diaphragm.

The vibrating actuator assembly may further include a moving unit that contacts an outer surface of the rotor and moves along the rotor according to a frictional force generated between the rotor and the moving unit.

The rotor may include a screw surface on an outer surface of the rotor.

The vibration shaft may include a protruding unit that externally protrudes, and the rotor contacts an outer end of the protruding unit.

The vibration shaft may include a protruding unit that externally protrudes, and the rotor may include a jaw unit that contacts the protruding unit.

The protruding unit may include a slope unit that has a slope along an extending direction of the vibration shaft, and the jaw unit may include a slope unit corresponding to the slope unit of the protruding unit.

The vibrating actuator assembly may further include an outer support unit having one end connected to the outer end of the vibration shaft, and another end that supports the diaphragm and the rotor by being connected to the diaphragm.

The vibrating actuator assembly may further include a buffer member between the outer support unit and the diaphragm.

The outer support unit may include a protrusion that protrudes towards the diaphragm, the diagraph may include a groove into which the protrusion is inserted, and the diaphragm may be supported by the protrusion.

The at least one vibrator may include a piezoelectric device.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, structures and operations of vibrating actuator assemblies according to embodiments will be described more fully with reference to the accompanying drawings.

Figure 1:
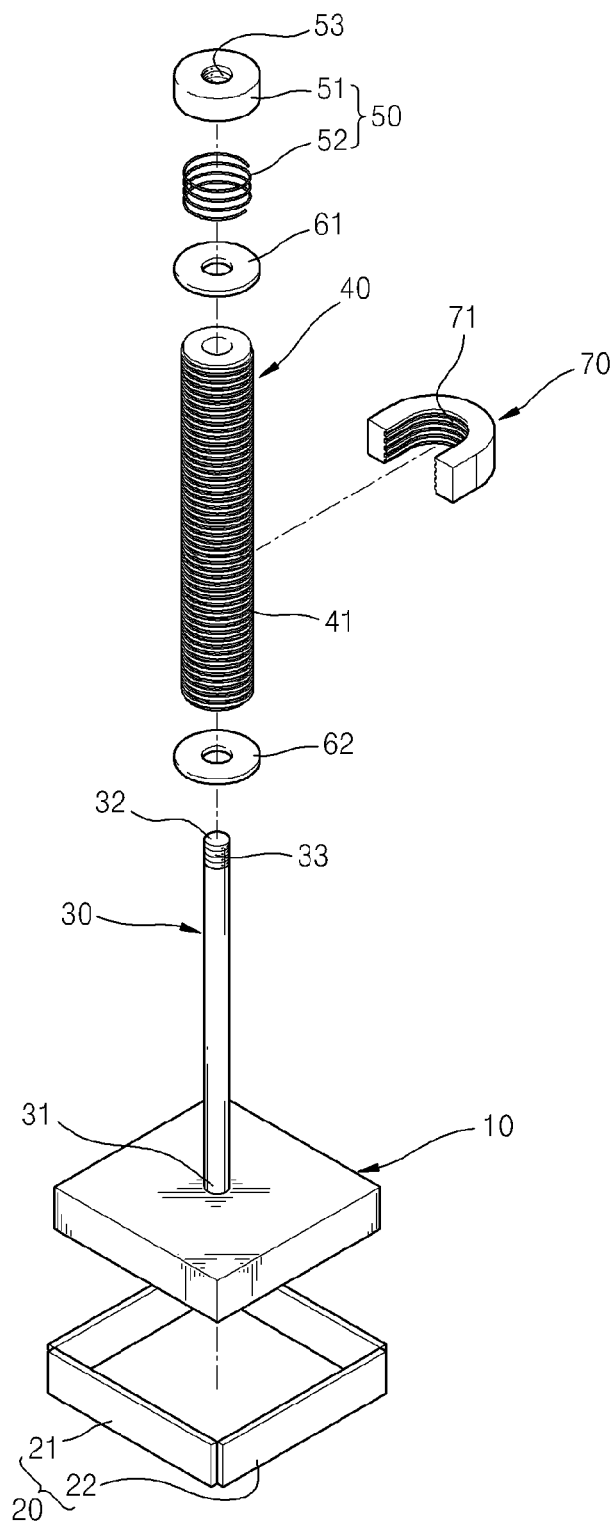
FIG. 1 is an exploded perspective view illustrating a vibrating actuator assembly according to an embodiment.
Figure 2:
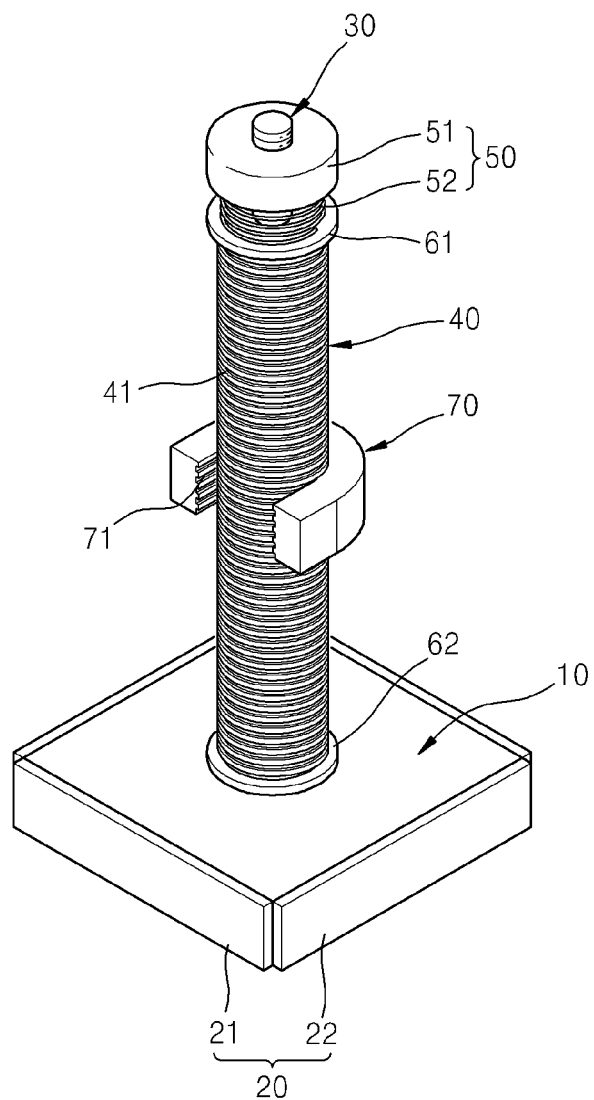
FIG. 2 is a perspective view illustrating an assembled state of the vibrating actuator assembly of FIG. 1.

FIG. 1 is an exploded perspective view illustrating a vibrating actuator assembly according to an embodiment, and FIG. 2 is a perspective view illustrating an assembled state of the vibrating actuator assembly of FIG. 1.

The vibrating actuator assembly of FIGS. 1 and 2 can include a diaphragm 10, a vibrator 20 that can vibrate the diaphragm 10, a vibration shaft 30 that can have one end 31 connected to the diaphragm 10, a rotor 40 that can be disposed on an outer side of the vibration shaft 30 to be moveable, and an elastic presser 50 that can be installed at another end 32 of the vibration shaft 30 to press the rotor 40.

The vibrator 20 can be disposed at a side of the diaphragm 10 and can vibrate when an electric signal is applied thereto. When the vibrator 20 vibrates, the diaphragm 10 can be vibrated by the vibrator 20. In the embodiment shown, the vibrator 20 can be disposed at the side of the diaphragm 10, but a location of the vibrator 20 is not limited thereto, and the vibrator 20 may be disposed behind or in front of the diaphragm 10.

The vibrator 20 may include a piezoelectric device. The piezoelectric device may be of a stacked type, wherein a plurality of electrodes can be stacked on each other, or of a single layer type. When an alternating current (AC) is supplied to the piezoelectric device, the piezoelectric device can generate a vibration according to a driving waveform of the supplied AC. Instead of the piezoelectric device, the vibrator 20 may include any other part that vibrates when a current is supplied thereto.

The vibrator 20 may include a first device 21 and a second device 22. The first and second devices 21 and 22 may vibrate independently when currents having different phases are supplied thereto. The vibrator 20 can include two devices, i.e., the first and second devices 21 and 22, but may include only one device. In other words, a vibrating motion of the diaphragm 10 may be realized by disposing one piezoelectric device at the diaphragm 10 and controlling a current supplied to the piezoelectric device.

The diaphragm 10 and the vibration shaft 30 may be integrally manufactured in one body. For example, a metal material, such as steel, stainless steel, or aluminum, may be cut and processed to manufacture the diaphragm 10 and the vibration shaft 30, which can be formed in a single body as shown in FIG. 1.

Alternatively, the diaphragm 10 and the vibration shaft 30 may be separately manufactured and then assembled. In other words, the diaphragm 10 may be manufactured by processing a plate-shaped material, and the vibration shaft 30 may be manufactured by processing a rod-shaped material. A screw surface may be formed on an outer surface of the one end 31 of the vibration shaft 30, and a screw hole may be formed in the diaphragm 10, which can engage the screw surface of the one end 31 of the vibration shaft 30, thereby connecting the diaphragm 10 and the vibration shaft 30 via a screw connection. Alternatively, the vibration shaft 30 and the diaphragm 10 may be combined by using a coupling unit, such as a rivet or a bolt, or a welding method.

The diaphragm 10 and the vibration shaft 30 may be formed of a metal material, such as iron, aluminum, or stainless steel, or a plastic material having sufficient hardness.

Since the one end 31 of the vibration shaft 30 can be connected to the diaphragm 10, vibration of the diaphragm 10 may be directly transferred to the vibration shaft 30.

The rotor 40 can be disposed on an outer side of the vibration shaft 30 so as to contact at least part of the outer surface of the vibration shaft 30. The rotor 40 can be elastically pressed toward the diaphragm 10 with a predetermined force by the elastic presser 50. The elastic presser 50 can be combined to the other end 32 of the vibration shaft 30.

The rotor 40 can be pressed toward the diaphragm 10 by the elastic presser 50, but a location of the rotor 40 may be changed with respect to the vibration shaft 30. In other words, the rotor 40 may rotate with respect to the vibration shaft 30 if a frictional force transferred from the vibration shaft 30 to the rotor 40 by vibration of the vibration shaft 30 is stronger than a force of the elastic presser 50 pressing the rotor 40.

The elastic presser 50 can include a support 51 that can be combined to the other end 32 of the vibration shaft 30 and an elastic member 52 that can have one end contacting the support 51 and other end contacting the rotor 40.

The support 51 can include a screw groove 53 and can be screwed to a screw surface 33 that can be formed on an outer surface of the other end 32 of the vibration shaft 30. A compression coil spring may be used as the elastic member 52, but any other mechanical element that has elasticity may be used, for example, a flat spring having a plate shape, rubber, or a fluid spring using a gas or liquid.

A first intermediate plate 61 can be disposed between the elastic member 52 and the rotor 40. Also, a second intermediate plate 62 can be disposed between the rotor 40 and the diaphragm 10. The first and second intermediate plates 61 and 62 can prevent abrasion due to friction between components while the rotor 40 moves with respect to the vibration shaft 30, while stably maintaining the elastic force applied to the rotor 40 by the elastic member 52. A washer may be used as the first and second intermediate plates 61 and 62.

A moving unit 70 may be installed on the outer surface of the rotor 40. Since the moving unit 70 can be disposed on the outer side of the rotor 40 to contact the rotor 40, friction can be generated between the rotor 40 and the moving unit 70 as the rotor 40 rotates. A screw surface 41 can be formed on the outer surface of the rotor 40, and a thread 71 can be formed on an inner surface of the moving unit 70, which can be screwed to the screw surface 41 of the rotor 40. Accordingly, the moving unit 70 may move along the rotor 40 as the rotor 40 rotates.

A above described structure that can combine the rotor 40 and the moving unit 70 is not limited thereto, and aside from a combining structure using the screw surface 41, another mechanical element for switching a rotation motion of the rotor 40 to rectilinear motion of the moving unit 70 may be used. For example, a ball screw structure or a gear assembly may be used between the rotor 40 and the moving unit 70.

Figure 3:
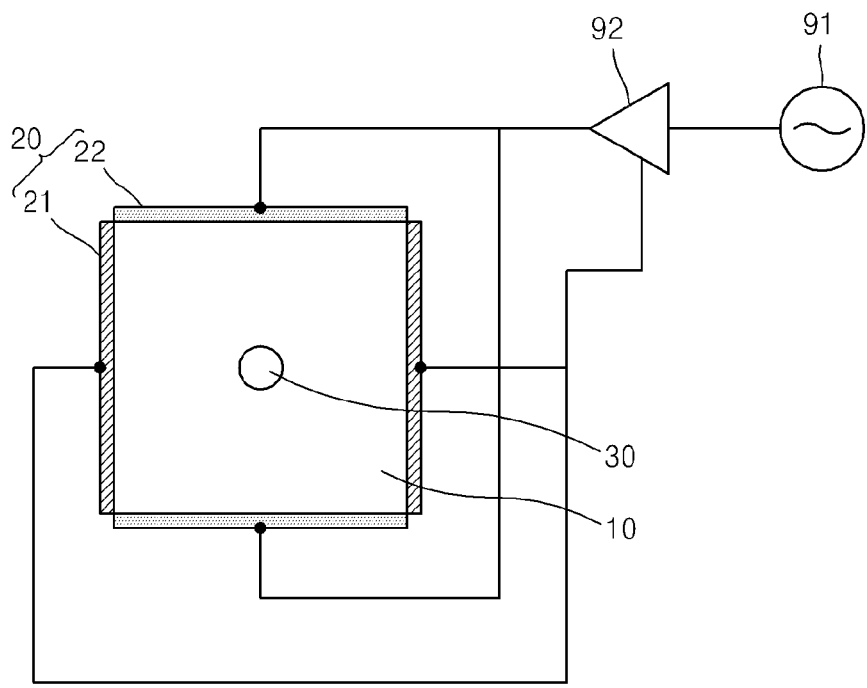
FIG. 3 is a schematic diagram of a vibrator of the vibrating actuator assembly of FIG. 2.

FIG. 3 is a schematic diagram for describing an operating principle of the vibrator 20 of the vibrating actuator assembly of FIG. 2.

The vibrator 20 that can be disposed on the outer side of the diaphragm 10 can include the first device 21, which is spaced apart in a horizontal direction with respect to the diaphragm 10, and the second device 22, which is spaced apart in a vertical direction with respect to the diaphragm 10. A current can be supplied from a power supply source 91 to the first and second devices 21 and 22. The current of the power supply source 91 can be converted to two electric signals having different phases through a phase converter 92, and thus, the currents having different phases can be respectively supplied to the first and second devices 21 and 22. When the current is supplied only to the first device 21, the diaphragm 10 can vibrate in right and left directions in FIG. 3. When the current is supplied only to the second device 22, the diaphragm 10 can vibrate in up and down directions in FIG. 3.

Figure 4:
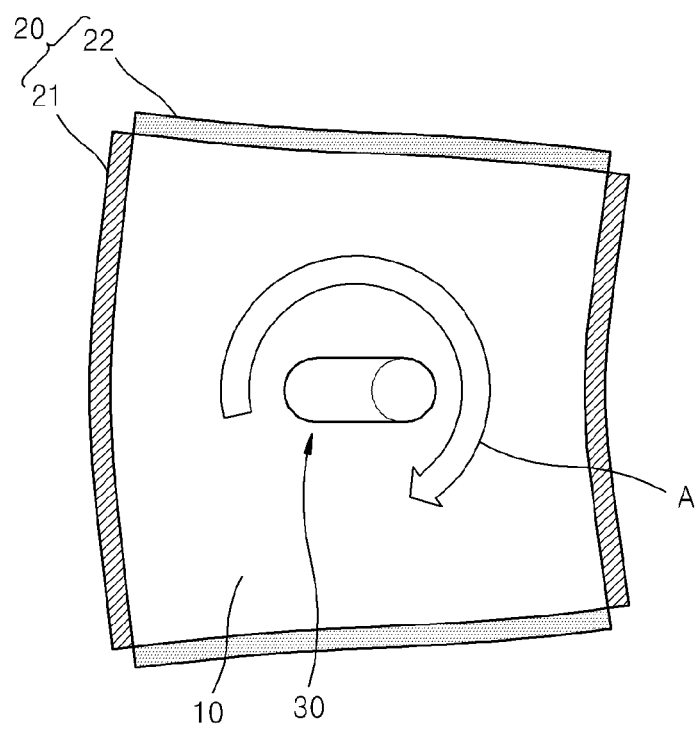
FIG. 4 is a schematic diagram of the vibrator of FIG. 3.

FIG. 4 is a schematic diagram for describing an example of how the vibrator 20 of FIG. 3 operates.

When currents having a phase difference of about 90° are supplied to the first and second devices 21 and 22 so as to use a resonance phenomenon for moving the rotor 40, the vibration shaft 30 can rotate in a direction indicated by an arrow A as the diaphragm 10 vibrates while changing its shape, as shown in FIG. 4.

The vibration shaft 30 can rub against the rotor 40 by amplifying a transformation motion according to vibration of the diaphragm 10, thereby transferring power to the rotor 40.

Figure 5:
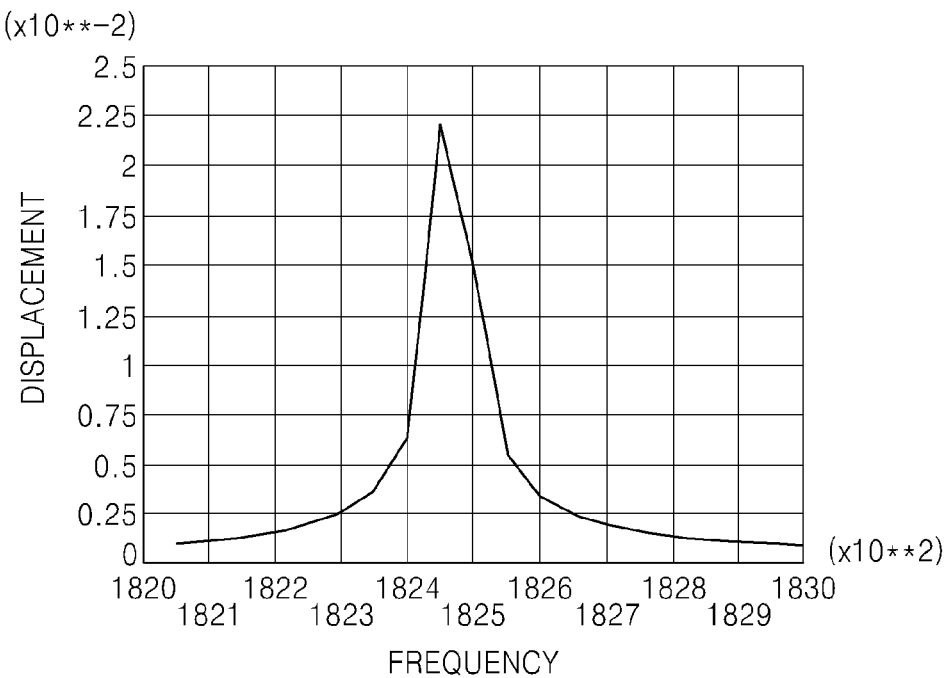
FIG. 5 is a graph of a displacement when the vibrator of FIG. 3 operates.

FIG. 5 is a graph of a displacement when the vibrator 20 of FIG. 3 operates. The graph of FIG. 5 shows a displacement according to a frequency of a vibrating motion generated in the vibration shaft 30 as the diaphragm 10 vibrates.

Referring to FIG. 5, the vicinity of a maximum value of the displacement (a change of a location of an end of the vibration shaft 30 with respect to a center point of the vibration shaft 30 when the vibration shaft 30 does not vibrate) of the vibrating motion of the vibration shaft 30 can correspond to a resonance point of the vibrating motion. A rotating speed of the rotor 40 may be adjusted by controlling a current supplied to the vibrator 20 in such a way that a motion is achieved in a frequency range of hundreds of Hz at the resonance point.

Figure 6:
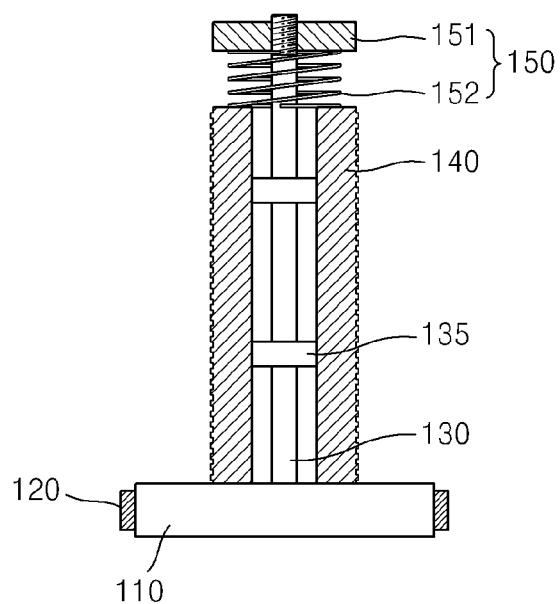
FIG. 6 is a side sectional view of a vibrating actuator assembly according to an embodiment.

FIG. 6 is a side sectional view of a vibrating actuator assembly according to an embodiment.

The vibrating actuator assembly of FIG. 6 can include a diaphragm 110, a vibrator 120 that can vibrate the diaphragm 110, a vibration shaft 130 that can be connected to the diaphragm 110, a rotor 140 that can be disposed on an outer side of the vibration shaft 130 to be moveable, and an elastic presser 150 that can press the rotor 140.

Like the elastic presser 50 of FIG. 1, the elastic presser 150 can include a support 151 that can be combined to the vibration shaft 130 and an elastic member 152 that can be supported by the support 151 and can press the rotor 140.

In the embodiment shown, a method of contacting the vibration shaft 130 and the rotor 140 can be different from that in the previous embodiment. The vibration shaft 130 can include a plurality of protruding units 135 that can externally protrude. The rotor 140 can contact an outer end of one or more of the plurality of protruding units 135. The number of protruding units 135 is not limiting, and only one protruding unit 135 may be formed on the outer side of the vibration shaft 130.

The vibration shaft 130 may be deformed along an extending direction of the vibration shaft 130 or a direction parallel to the vibration shaft 130 according to a vibration received from the diaphragm 110. The plurality of protruding units 135 can effectively transmit power according to the motion of the vibration shaft 130. In other words, when the upper protruding unit 135 is spaced apart from the rotor 140 so that the upper protruding unit 135 is not contacting the rotor 140, the lower protruding unit 135 can contact the rotor 140, and vice versa. Accordingly, the vibration shaft 130 can always contact the rotor 140 and can transmit driving power to the rotor 140.

Figure 7:
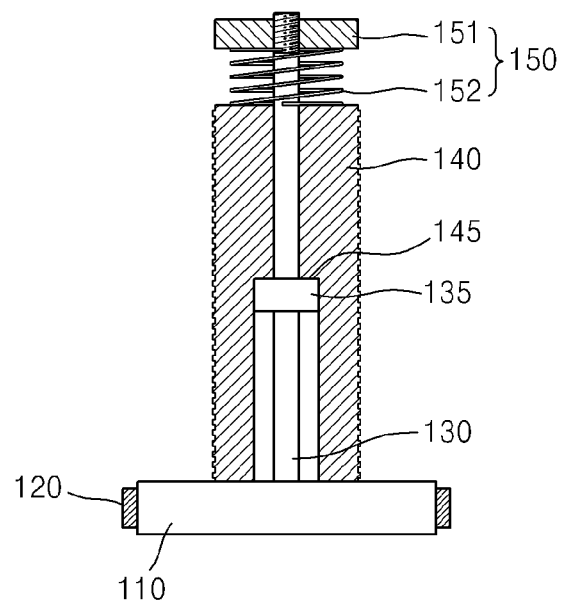
FIG. 7 is a side sectional view of a vibrating actuator assembly according to another embodiment.

FIG. 7 is a side sectional view of a vibrating actuator assembly according to another embodiment.

According to the vibrating actuator assembly of FIG. 7, one protruding unit 135 can be installed on an outer side of a vibration shaft 130. The protruding unit 135 can transmit a vibration of the vibration shaft 130 to the rotor 140 by contacting an inner surface of the rotor 140. The rotor 140 can include a jaw unit 145 formed by removing part of the rotor 140 in a thickness direction.

The jaw unit 145 of the rotor 140 can contact at least one surface of the protruding unit 135, and thus, a contact between the vibration shaft 130 and the rotor 140 can be effectively maintained. In other words, since the jaw unit 145 can transmit pressing force applied to the rotor 140 by the elastic presser 150 to the protruding unit 135, a strong frictional force may be generated between the protruding unit 135 and the jaw unit 145.

Figure 8:
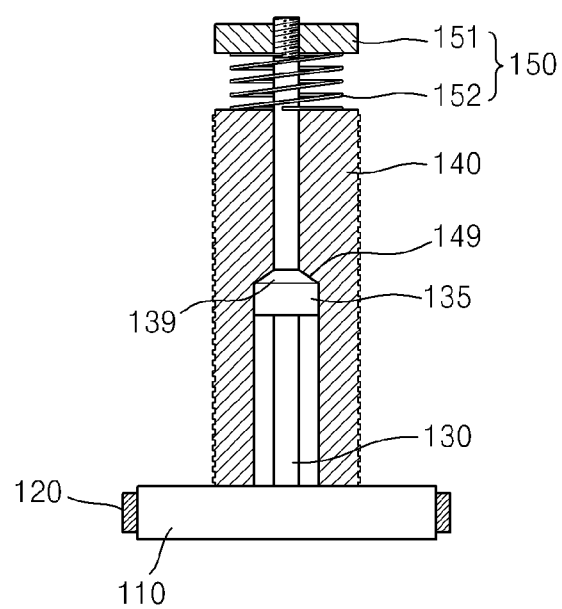
FIG. 8 is a side sectional view of a vibrating actuator assembly according to another embodiment.

FIG. 8 is a side sectional view of a vibrating actuator assembly according to another embodiment.

In the vibrating actuator assembly of FIG. 8, the protruding unit 135 protruding on the outer surface of the vibration shaft 130 can include a slope unit 139 that can form a slope along an extending direction of the vibration shaft 130. Also, the rotor 140 can include a slope unit 149 that can form a slope along an extending direction of the rotor 140 to correspond to the slope unit 139 of the protruding unit 135.

The slope unit 139 formed on the protruding unit 135 of the vibration shaft 130, and the slope unit 149 of the rotor 140 can stably maintain contact between the vibration shaft 130 and the rotor 140, thereby improving a power transmission effect due to friction.

Figure 9:
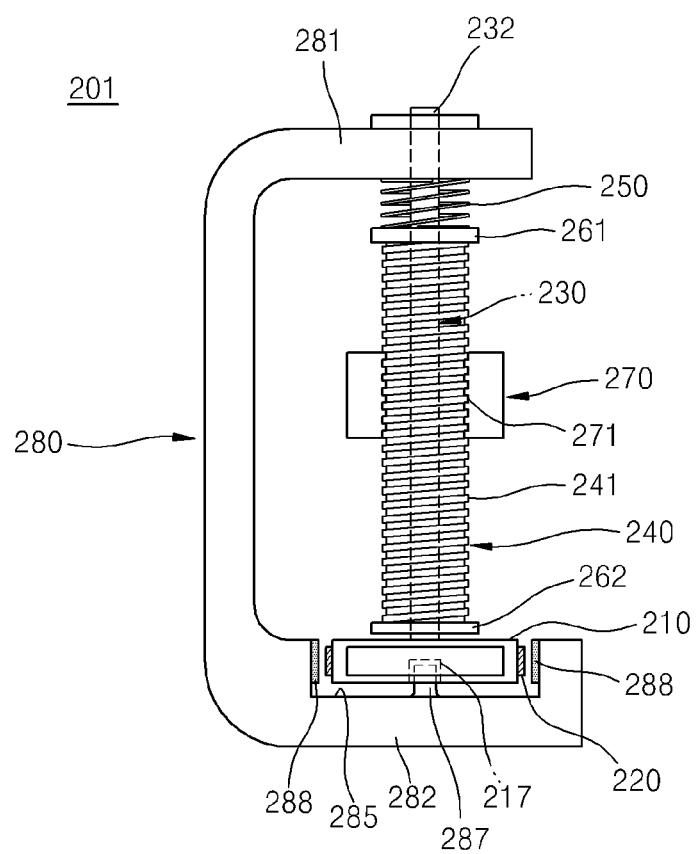
FIG. 9 is a side sectional view of a vibrating actuator assembly according to another embodiment.
Figure 10:
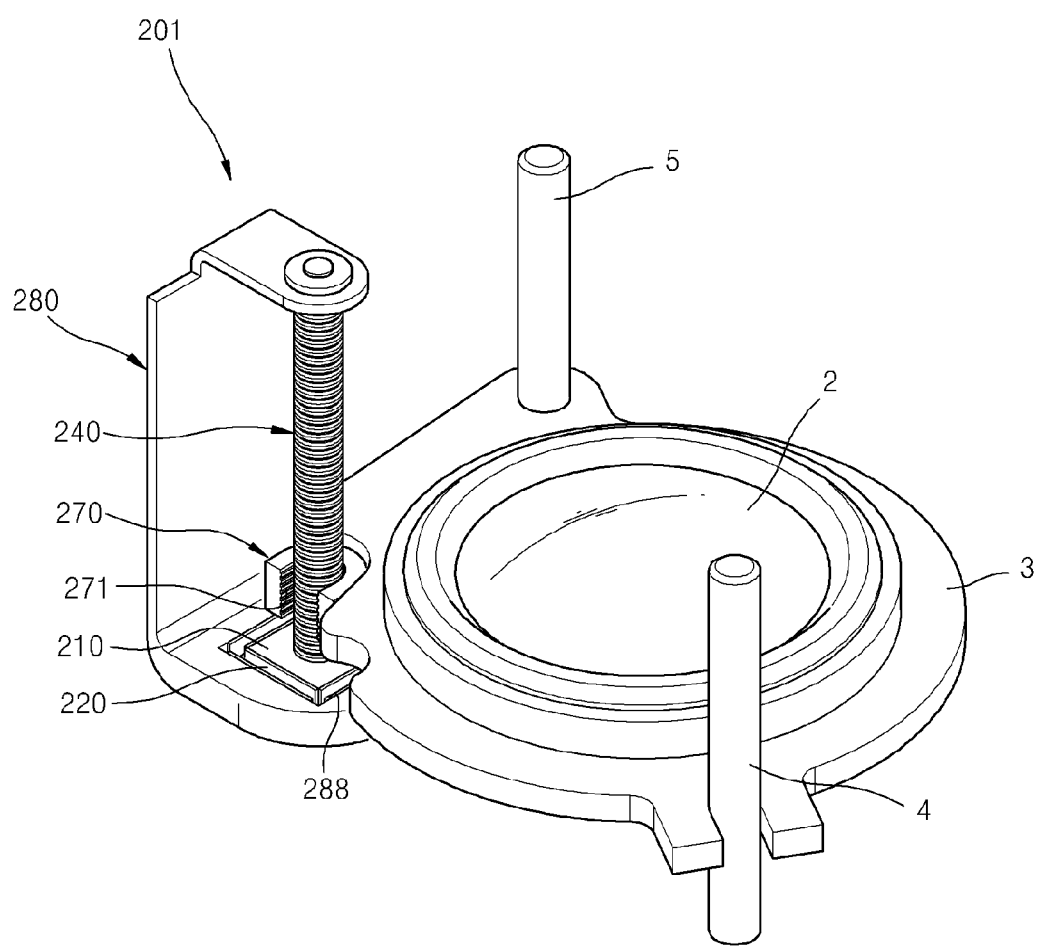
FIG. 10 is a perspective view of an optical system with the vibrating actuator assembly of FIG. 9, according to an embodiment.

FIG. 9 is a side sectional view of a vibrating actuator assembly 201 according to another embodiment, and FIG. 10 is a perspective view of an optical system including the vibrating actuator assembly 201 of FIG. 9, according to an embodiment.

The vibrating actuator assembly 201 of FIGS. 9 and 10 can include a diaphragm 210, a vibrator 220 that can vibrate the diaphragm 210, a vibration shaft 230 that can be connected to the diaphragm 210, a rotor 240 that can be disposed on an outer side of the vibration shaft 230 to be moveable, an elastic presser 250 that can press the rotor 240, and an outer support unit 280 that can support the diaphragm 210 and the rotor 240 by having one end 281 combined to an end 232 of the vibration shaft 230, and another end 282 combined to the diaphragm 210.

Since the elastic presser 250 can be disposed between the one end 281 of the outer support unit 280 and the rotor 240, the rotor 240 may be pressed toward the diaphragm 210. A first intermediate plate 261 can be installed between the elastic presser 250 and the rotor 240. Also, a second intermediate plate 262 can be installed between the rotor 240 and the diaphragm 210.

A groove 285 in which the diaphragm 210 can be disposed can be formed in the other end 282 of the outer support unit 280. A protrusion 287 that can protrude toward the diaphragm 210 can be formed in the groove 285 of the outer support unit 280. Since the diaphragm 210 can include a groove 217 into which the protrusion 287 can be inserted, the diaphragm 210 can be supported by the protrusion 287 of the outer support unit 280.

The vibrator 220 can be disposed on a side of the diaphragm 210 and can vibrate when an electric signal is applied thereto. When the vibrator 220 vibrates, the diaphragm 210 can vibrate according to the vibrator 220. A buffer member 288 can be disposed between the groove 285 of the outer support unit 280 and the diaphragm 210. The buffer member 288 can absorb a shock generated when the diaphragm 210 collides with the outer support unit 280 when the diaphragm 210 changes its shape due to the vibrator 220.

A moving unit 270 that can move along the rotor 240 can be disposed on an outer side of the rotor 240. A screw surface 241 is formed on an outer surface of the rotor 240, and a thread 271 that can be screwed to the screw surface 241 of the rotor 240 can be formed on an inner surface of the moving unit 270.

The moving unit 270 can be installed on an outer side of a lens frame 3. The lens frame 3 can support a lens 2 and may slide along guide rails 4 and 5. When the rotor 240 rotates, driving power can be transferred to the moving unit 270 screwed to the rotor 240, and thus the lens frame 3 can slide along the guide rails 4 and 5.

By using the vibrating actuator assembly 201, vibration generated by controlling the vibrator 220 may be transferred to the rotor 240 through the diaphragm 210 and the vibration shaft 230, and a location of the lens 2 may be precisely adjusted via a rotation motion of the rotor 240. Since the vibrating actuator assembly 201 can have a simpler structure than a conventional vibrating actuator assembly that uses a stepping motor or an element such as a gear or a cam, an error between the elements may be reduced. Moreover, a compact design is possible and noise and vibration may be remarkably reduced.

According to the vibrating actuator assemblies of the above embodiments, a precise position control is possible by moving the rotor by using the vibration shaft connected to the diaphragm that vibrates due to the vibrator. Also, since the vibrating actuator assemblies have simpler structures than a conventional vibrating actuator assembly, an error generated between elements may be reduced, a compact design is possible, and noise and vibration may be remarkably reduced.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc. Also, using the disclosure herein, programmers of ordinary skill in the art to which the invention pertains can easily implement functional programs, codes, and code segments for making and using the invention.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will also be recognized that the terms "comprises," "comprising," "includes," "including," "has," and "having," as used herein, are specifically intended to be read as open-ended terms of art. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention. Therefore, the scope of the invention is defined not by the detailed description of the invention but by the following claims, and all differences within the scope will be construed as being included in the invention.

What is claimed is:
1. A vibrating actuator assembly comprising:
a diaphragm;
at least one vibrator disposed at the diaphragm and that vibrates when an electric signal is applied thereto;
a vibration shaft having one end coupled to the diaphragm;

a rotor disposed on an outer side of the vibration shaft to contact an outer surface of the vibration shaft and that moves by vibration of the vibration shaft, wherein the rotor comprises a screw surface on an outer surface of the rotor; and an elastic presser disposed at another end of the vibration shaft and that elastically presses the rotor toward the diaphragm.

2. The vibrating actuator assembly of claim 1, wherein the elastic presser comprises a support combined to the other end of the vibration shaft, and an elastic member having one end contacting the support and another end contacting the rotor.

3. The vibrating actuator assembly of claim 2, further comprising a first intermediate plate disposed between the elastic member and the rotor.

4. The vibrating actuator assembly of claim 3, further comprising a second intermediate plate disposed between the rotor and the diaphragm.

5. The vibrating actuator assembly of claim 1, further comprising a moving unit that contacts an outer surface of the rotor and moves along the rotor according to a frictional force generated between the rotor and the moving unit.

6. The vibrating actuator assembly of claim 1, wherein the vibration shaft comprises a protruding unit that externally protrudes, and the rotor contacts an outer end of the protruding unit.

7. The vibrating actuator assembly of claim 1, further comprising an outer support unit having one end coupled to the outer end of the vibration shaft, and another end that supports the diaphragm and the rotor by being coupled to the diaphragm.

8. The vibrating actuator assembly of claim 1, wherein the at least one vibrator comprises a piezoelectric device.

9. A vibrating actuator assembly comprising:
a diaphragm;
at least one vibrator disposed at the diaphragm and that vibrates when an electric signal is applied thereto;
a vibration shaft having one end coupled to the diaphragm;
a rotor disposed on an outer side of the vibration shaft to contact an outer surface of the vibration shaft and that moves by vibration of the vibration shaft; and
an elastic presser disposed at another end of the vibration shaft and that elastically presses the rotor toward the diaphragm,
wherein the vibration shaft comprises a protruding unit that externally protrudes, and the rotor comprises a jaw unit that contacts the protruding unit.

10. The vibrating actuator assembly of claim 9, wherein the protruding unit comprises a slope unit that has a slope along an extending direction of the vibration shaft, and the jaw unit comprises a slope unit corresponding to the slope unit of the protruding unit.

11. A vibrating actuator assembly comprising:
a diaphragm;
at least one vibrator disposed at the diaphragm and that vibrates when an electric signal is applied thereto;
a vibration shaft having one end coupled to the diaphragm;
a rotor disposed on an outer side of the vibration shaft to contact an outer surface of the vibration shaft and that moves by vibration of the vibration shaft;
an elastic presser disposed at another end of the vibration shaft and that elastically presses the rotor toward the diaphragm;
an outer support unit having one end coupled to the outer end of the vibration shaft, and another end that supports the diaphragm and the rotor by being coupled to the diaphragm; and
a buffer member disposed between the outer support unit and the diaphragm.

12. A vibrating actuator assembly comprising:
a diaphragm;
at least one vibrator disposed at the diaphragm and that vibrates when an electric signal is applied thereto;
a vibration shaft having one end coupled to the diaphragm;
a rotor disposed on an outer side of the vibration shaft to contact an outer surface of the vibration shaft and that moves by vibration of the vibration shaft;
an elastic presser disposed at another end of the vibration shaft and that elastically presses the rotor toward the diaphragm;
an outer support unit having one end coupled to the outer end of the vibration shaft, and another end that supports the diaphragm and the rotor by being coupled to the diaphragm,
wherein the outer support unit comprises a protrusion that protrudes towards the diaphragm, the diagraph comprises a groove into which the protrusion is inserted, and the diaphragm is supported by the protrusion.

* * * * *